US011485429B2

(12) United States Patent
Yen et al.

(10) Patent No.: US 11,485,429 B2
(45) Date of Patent: Nov. 1, 2022

(54) CONTROL SYSTEM FOR ACTIVE AERODYNAMIC DEVICES

(71) Applicant: GM GLOBAL TECHNOLOGY OPERATIONS LLC, Detroit, MI (US)

(72) Inventors: Chih-Hung Yen, Bloomfield Hills, MI (US); Taeyoung Han, Bloomfield Hills, MI (US); Alok Warey, Novi, MI (US); Kuo-Huey Chen, Troy, MI (US); Bahram Khalighi, Birmingham, MI (US); Shailendra Kaushik, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 401 days.

(21) Appl. No.: 16/780,361

(22) Filed: Feb. 3, 2020

(65) Prior Publication Data
US 2021/0237810 A1    Aug. 5, 2021

(51) Int. Cl.
*B62D 35/00* (2006.01)
(52) U.S. Cl.
CPC ............................ *B62D 35/00* (2013.01)
(58) Field of Classification Search
CPC ...................................................... B62D 35/00
See application file for complete search history.

(56) References Cited

U.S. PATENT DOCUMENTS

| 7,874,610 | B2 | 1/2011 | Khalighi | |
|---|---|---|---|---|
| 9,821,862 | B2 | 11/2017 | Han et al. | |
| 9,937,963 | B2 * | 4/2018 | Sandgren | B60N 2/002 |
| 10,308,294 | B2 * | 6/2019 | Yoon | B62D 37/02 |
| 2007/0257512 | A1 * | 11/2007 | Anderson | B62D 35/00 296/180.1 |
| 2017/0088200 | A1 * | 3/2017 | Heil | B62D 37/02 |
| 2018/0065690 | A1 | 3/2018 | Han et al. | |
| 2018/0111650 | A1 * | 4/2018 | Swantick | B62D 35/005 |
| 2018/0281874 | A1 | 10/2018 | Han et al. | |
| 2018/0314269 | A1 * | 11/2018 | Dudar | B60R 3/02 |

(Continued)

FOREIGN PATENT DOCUMENTS

| DE | 112006000449 T5 | 1/2008 |
|---|---|---|
| DE | 102016218052 A1 | 3/2017 |

(Continued)

OTHER PUBLICATIONS

U.S. Appl. No. 15/954,788, filed Apr. 17, 2018, Khalighi et al.

(Continued)

*Primary Examiner* — Lori L Lyjak (57) ABSTRACT

A control system of a vehicle comprising: i) a plurality of adjustable aerodynamic control devices associated with the vehicle; ii) a fuel economy sensor configured to determine a first fuel economy measurement; and iii) an aerodynamic device controller module configured to adjust a first one of the plurality of adjustable aerodynamic control devices and to receive from the fuel economy sensor a second fuel economy measurement. The aerodynamic device controller module stores in an onboard database state information corresponding to settings of the plurality of adjustable aerodynamic control devices if the second fuel economy measurement is an improvement over the first fuel economy measurement.

20 Claims, 5 Drawing Sheets

(56) References Cited

U.S. PATENT DOCUMENTS

2019/0217866 A1* 7/2019 Creguer ............... B60W 50/14
2019/0258251 A1* 8/2019 Ditty .................... G06V 20/58

FOREIGN PATENT DOCUMENTS

| DE | 102017120706 A1 | 3/2018 | |
| DE | 102018206305 A1 | 10/2019 | |
| EP | 2512904 B1 | 4/2016 | |
| WO | WO-2020006641 A1 * | 1/2020 | ............... B60T 7/22 |

OTHER PUBLICATIONS

U.S. Appl. No. 15/966,376, filed Apr. 30, 2018, Han et al.
U.S. Appl. No. 15/970,221, filed May 3, 2018, Dadheech et al.
U.S. Appl. No. 16/227,177, filed Dec. 20, 2018, Han et al.
U.S. Appl. No. 16/443,029, filed Jun. 17, 2019, Han et al.

* cited by examiner

CONTROL SYSTEM FOR ACTIVE AERODYNAMIC DEVICES

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

In general, aerodynamic drag is one of largest energy loss factors for all vehicles, including cars, trucks, aircraft, and boats. Any factor that increases or decreases the aerodynamic drag of a vehicle will directly increase or decrease the range of the vehicle. This is particularly important for all-electric vehicles and hybrid electric vehicles, where aerodynamic drag significantly affects the drain on the battery. To increase range, many vehicles include a number of active devices that may be adjusted to reduce aerodynamic drag. However, due to the complexity of airflows associated with vehicles, it is difficult to optimize a pre-fixed active flow control strategy under various driving conditions.

SUMMARY

It is an aspect of the present disclosure to provide a control system of a vehicle comprising: i) a plurality of adjustable aerodynamic control devices associated with the vehicle; ii) a fuel economy sensor configured to determine a first fuel economy measurement; and iii) an aerodynamic device controller module configured to adjust a first one of the plurality of adjustable aerodynamic control devices and to receive from the fuel economy sensor a second fuel economy measurement. The aerodynamic device controller module is further configured to store in an onboard database state information corresponding to settings of the plurality of adjustable aerodynamic control devices if the second fuel economy measurement is an improvement over the first fuel economy measurement.

In one embodiment, the control system further comprises a vehicle stability sensor configured to determine a first vehicle stability measurement, wherein the aerodynamic device controller module, in response to the adjustment of the first adjustable aerodynamic control device, receives from the vehicle stability sensor a second vehicle stability measurement.

In another embodiment, the aerodynamic device controller module is further configured to store in the onboard database state information corresponding to settings of the plurality of adjustable aerodynamic control devices if the second vehicle stability measurement is an improvement over the first vehicle stability measurement.

In still another embodiment, the control system further comprises a wireless transceiver coupled to the aerodynamic device controller and configured to communicate with a remote cloud storage database via a cellular network. The aerodynamic device controller module is further configured to transmit to the remote cloud storage database via the wireless transceiver the state information corresponding to settings of the plurality of adjustable aerodynamic control devices if the second fuel economy measurement is an improvement over the first fuel economy measurement.

In yet another embodiment, the aerodynamic device controller module is further configured to transmit to the remote cloud storage database via the wireless transceiver the state information corresponding to settings of the plurality of adjustable aerodynamic control devices if the second vehicle stability measurement is an improvement over the first vehicle stability measurement.

In a further embodiment, the aerodynamic device controller module further comprises: i) a control and coordination module; and ii) a self-learning system module coupled to the control and coordination module and including a deep neural network. The control and coordination module receives vehicle data and weather data and stores the state information corresponding to settings of the plurality of adjustable aerodynamic control devices in the onboard database.

In a still further embodiment, the vehicle data includes a vehicle speed value.

In a yet further embodiment, the vehicle data includes GPS road data and wherein the GPS road data includes a vehicle direction value.

In one embodiment, the vehicle data includes yaw data, roll data, and pitch data.

In another embodiment, the weather data includes a wind speed value and a wind direction value.

It is a second aspect of the present disclosure to provide a method of controlling a plurality of adjustable aerodynamic control devices associated with a vehicle. The method comprises: i) in a fuel economy sensor, determining a first fuel economy measurement; ii) adjusting a first one of the plurality of adjustable aerodynamic control devices; iii) receiving from the fuel economy sensor a second fuel economy measurement; and iv) storing in an onboard database of the vehicle state information corresponding to settings of the plurality of adjustable aerodynamic control devices if the second fuel economy measurement is an improvement over the first fuel economy measurement.

In one embodiment, the method further comprises: i) in a vehicle stability sensor, determining a first vehicle stability measurement; and ii) in response to the adjustment of the first adjustable aerodynamic control device, receiving from the vehicle stability sensor a second vehicle stability measurement.

In another embodiment, the method further comprises storing in the onboard database state information corresponding to settings of the plurality of adjustable aerodynamic control devices if the second vehicle stability measurement is an improvement over the first vehicle stability measurement.

In still another embodiment, the method further comprises transmitting to the remote cloud storage database via a wireless transceiver the state information corresponding to settings of the plurality of adjustable aerodynamic control devices if the second fuel economy measurement is an improvement over the first fuel economy measurement.

In yet another embodiment, the method further comprises transmitting to the remote cloud storage database via the wireless transceiver the state information corresponding to settings of the plurality of adjustable aerodynamic control devices if the second vehicle stability measurement is an improvement over the first vehicle stability measurement.

In a further embodiment, the vehicle state information corresponding to settings of the plurality of adjustable aerodynamic control devices is performed by a self-learning system module including a deep neural network, and the method further includes: i) receiving vehicle data and weather data; and ii) storing the state information corresponding to settings of the plurality of adjustable aerodynamic control devices in the onboard database.

In a still further embodiment, the vehicle data includes a vehicle speed value.

In a yet further embodiment, the vehicle data includes GPS road data and wherein the GPS road data includes a vehicle direction value.

In one embodiment, the vehicle data includes yaw data, roll data, and pitch data.

In another embodiment, the weather data includes a wind speed value and a wind direction value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure described an intelligent system that may achieve better fuel economy and improved vehicle stability by coordinating and controlling active flow control devices on a vehicle under various environmental conditions. The intelligent system may be self-learning and self-improving using machine learning (e.g., reinforced learning) based on actual driving conditions. The disclosed intelligent system uses information from telemetric and on-vehicle sensors to train the intelligent system for better fuel economy and vehicle stability. Using such an intelligent system, the active flow control devices work together and achieve a better performance.

Figure 1A:
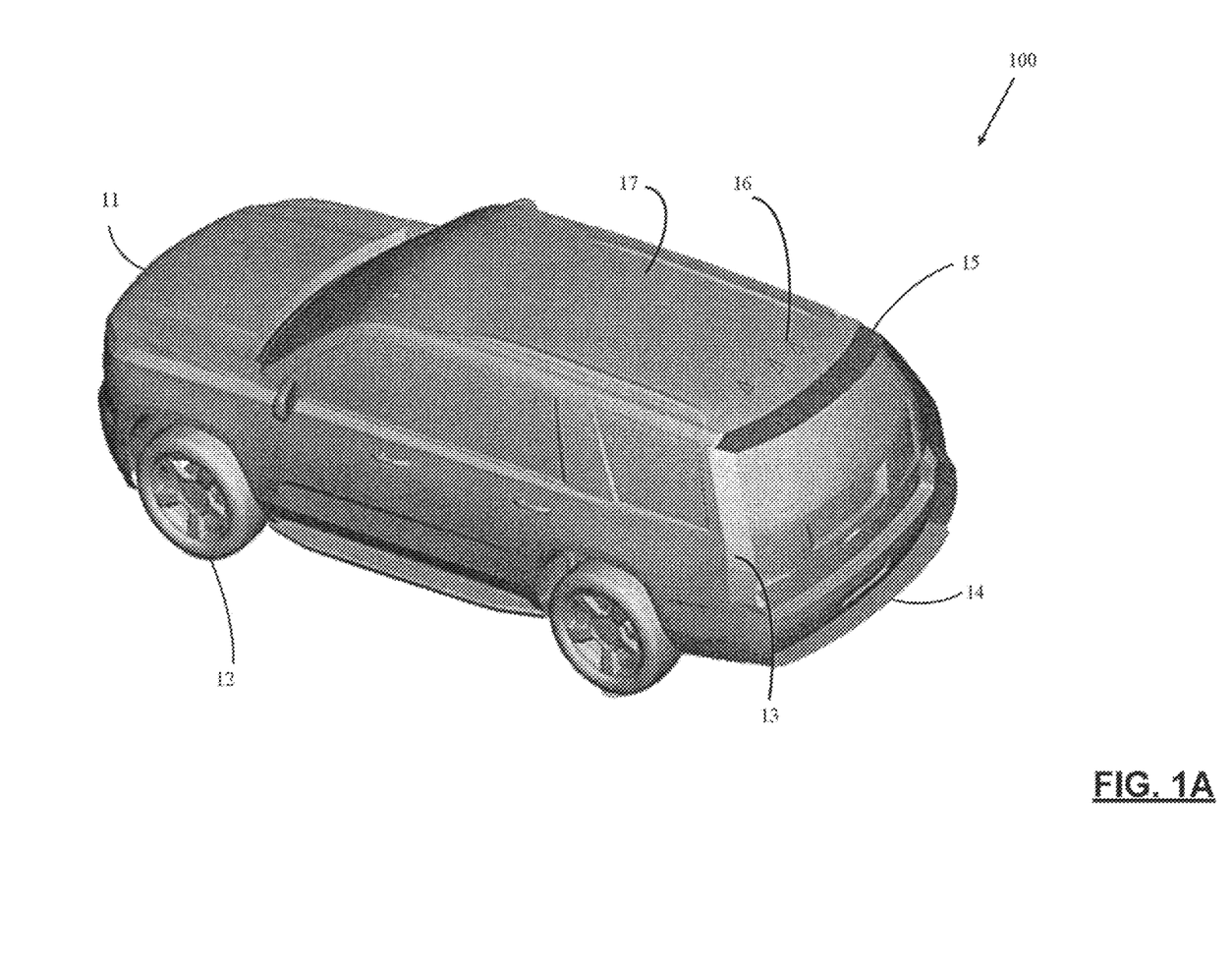
FIG. 1A is a perspective view of a vehicle that incorporates active aerodynamic flow control devices according to the principles of the present disclosure.

FIG. 1A is a perspective view of a vehicle 100 that incorporates active aerodynamic control devices according to the principles of the present disclosure. In the exemplary embodiment, the active aerodynamic control devices include an adjustable air dam 11 and an active grille shutter, disposed on the front-end of the vehicle 100. The active aerodynamic control devices also comprise a plurality of wheel shutters 12 on the wheels of the vehicle 100, a plurality of deployable side panels 13, at least one active bottom diffuser 14, an active spoiler 15, a plurality of deployable vortex generators 16, and a plurality of deployable top panels 17. In each case, the active aerodynamic control devices 11-17 include both a control surface for directing the flow of air and one or more actuators that control the opening or closing of a control surface and/or how far a control surface is deployed or extended.

It will be understood by those skilled in the art that the active aerodynamic control devices 11-17 described above are merely exemplary and are not intended to be an exhaustive list of such active aerodynamic control devices. In alternate embodiments, the vehicle 100 may include other similar active aerodynamic control devices in addition to, or in place of one or more of, the active aerodynamic control devices 11-17 described herein.

The vehicle 100 further includes a self-learning controller (and system) that, coupled with the active flow control devices 11-17, may potentially achieve optimum vehicle performance in terms of fuel economy and vehicle stability. The self-learning controller executes a control algorithm for active flow control that may be initially pre-calibrated based on a database using simulations and tunnel test. During actual operating conditions, the self-learning controller may continuously refine and update the control algorithm based on a reward system for the improved vehicle performance assessed from telemetric and on-vehicle sensors. The self-learning controller determines which active devices 11-17 to deploy and by what amount (e.g., distance, open, closed).

The self-learning controller uses as inputs telemetric information, such as weather conditions (e.g., wind speed, wind direction), geometric road data (e.g., X-, Y-, Z-coordinates), and data or information from on-vehicle sensors. In an exemplary embodiment, the self-learning controller optimizes vehicle fuel economy (or average fuel economy) and vehicle stability. The self-learning controller may filter the vehicle data (inputs and outputs) to remove non-aerodynamic drag-related noise, may tag the vehicle data to identify comparable conditions, and may store the vehicle data locally or remotely for reinforced learning by the self-learning controller.

The self-learning controller may comprise a closed-loop control system that coordinates the adjustable aerodynamic devices 11-17 on the vehicle 100 to achieve collectively an optimal fuel economy and vehicle stability. The self-learning controller determines a configuration of the adjustable devices 11-17 based on actual driving (e.g., vehicle speed, vehicle, orientation), environment (e.g., wind speed, wind direction), and terrain (e.g., roads, elevation). The self-learning controller and system may be self-improved over time by utilizing accumulated data of the vehicle 100 or a group of vehicles in the region.

Figure 1B:
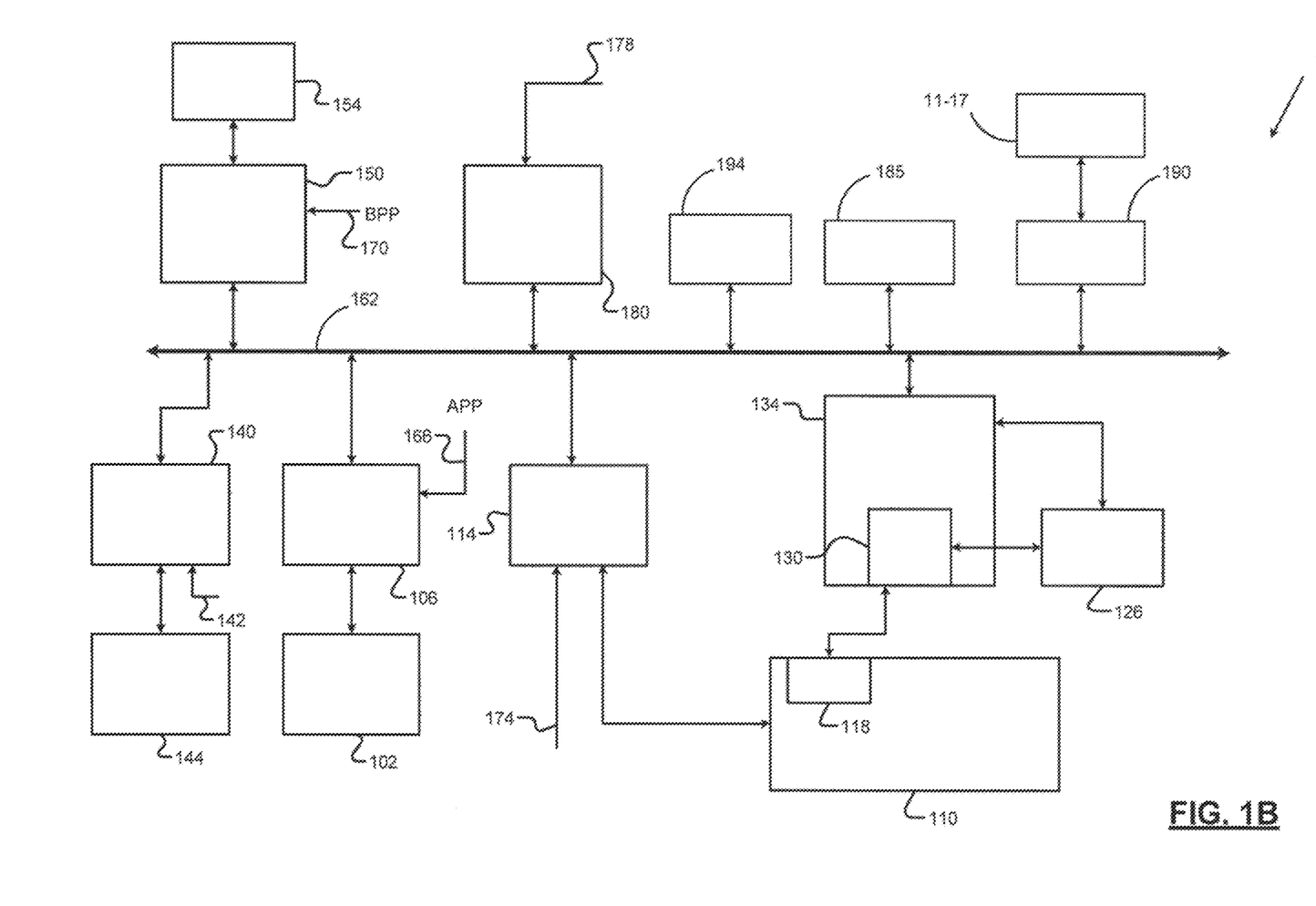
FIG. 1B is a functional block diagram of an exemplary vehicle engine system and exemplary active aerodynamic flow control devices according to the principles of the present disclosure.

FIG. 1B is a functional block diagram of an exemplary vehicle engine system and exemplary active aerodynamic flow control devices according to the principles of the present disclosure. While a vehicle system for a hybrid vehicle is shown and will be described, the present disclosure is also applicable to all-electric vehicles, fuel cell vehicles, autonomous vehicles, non-electric vehicles, and other types of vehicles. Also, while the example of a vehicle is provided, the present application is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system also includes an aerodynamic device controller module 185, and aerodynamic device actuators module 190, and a mobile transceiver 194. According to an exemplary embodiment, the aerodynamic device controller module 185 comprises a self-learning controller (or system) that, coupled with the active aerodynamic flow control devices 11-17, optimizes vehicle performance in terms of fuel economy and vehicle stability. As explained below in greater detail, aerodynamic device controller module 185 is configured to communicate with a cellular network via mobile transceiver 194. Furthermore, mobile transceiver 194 may comprise a plurality of wireless transceivers configured to communicate with a plurality of diverse external networks and devices, including cellular networks (e.g., 3G networks, 4G networks, LTE networks, etc.), Bluetooth-enabled devices, WiFi networks, and the like. Therefore, the aerodynamic device controller module 185 is also configured to communicate with a nearby mobile device, such as a smartphone, via mobile transceiver 194 using a Bluetooth connection or a WiFi connection.

The aerodynamic device actuators module 190 comprises the electromechanical components necessary to move the active aerodynamic flow control devices 11-17 into the positions determined by the aerodynamic device controller module 185. These components may include, among other things, motors, control boards, hydraulic or pneumatic pistons, and assorted mechanical coupling devices.

Figure 2:
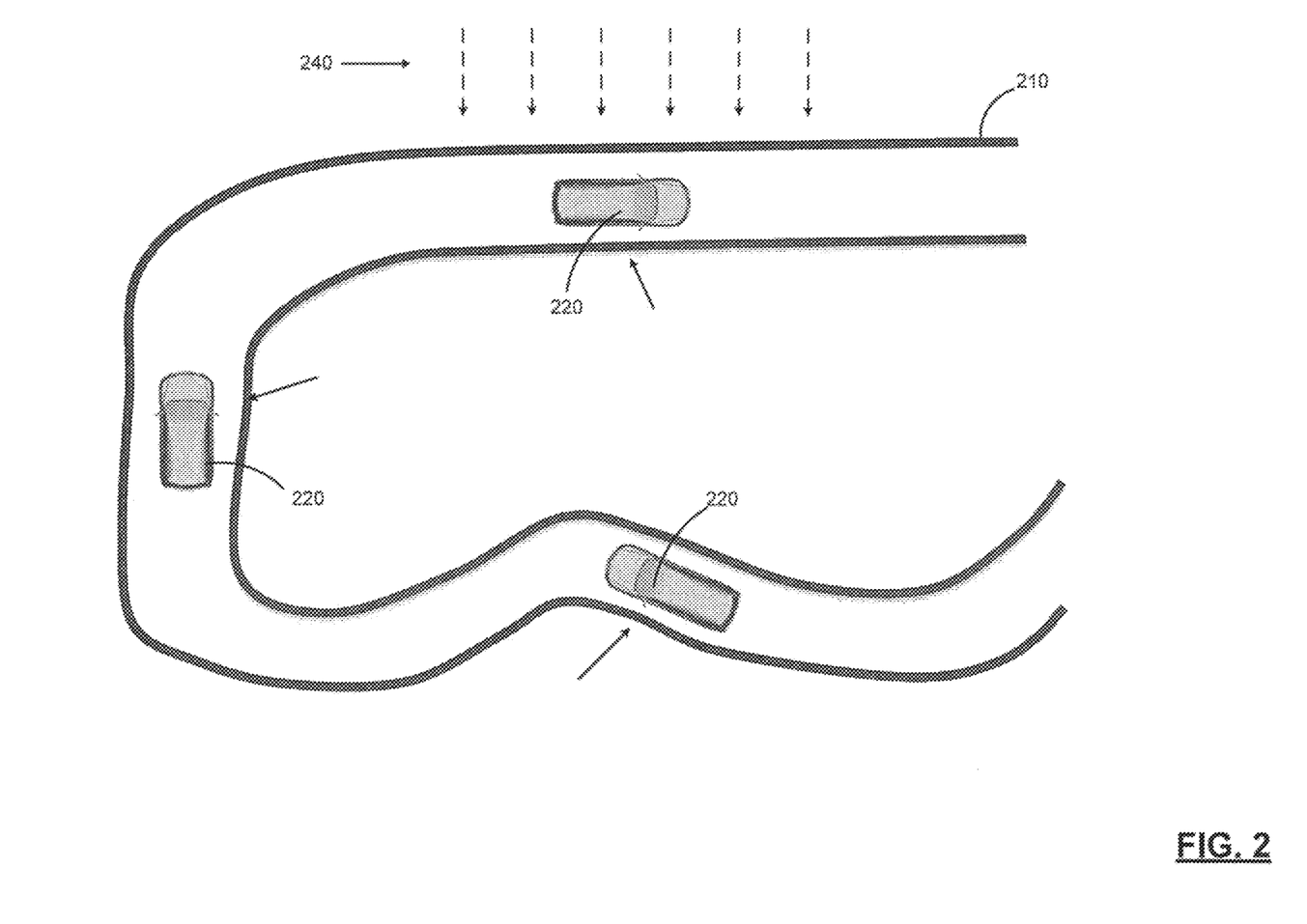
FIG. 2 illustrates an example of active flow control in a self-learning system as a vehicle moves along a roadway in varying driving conditions.

FIG. 2 illustrates an example of active flow control in a self-learning system as a vehicle moves along a roadway in varying driving conditions. In FIG. 2, a vehicle 220 drives along the roadway 210 from position A to position B and then to position C. The dotted line arrow 240 indicate the general wind direction. Assuming the top of FIG. 2 is north, the wind is blowing from north to south. At position A, the vehicle is traveling approximately to the northwest. At position B, the vehicle is traveling approximately to the north. At position C, the vehicle is traveling approximately to the east.

Based on road conditions (e.g., up and down hills, surface smoothness, banked surface, etc.) and the wind strength and speed, the aerodynamic device controller module 185 dynamically adjusts the active aerodynamic flow control devices 11-17 to optimize fuel economy and to stabilize vehicle movement. By way of example, at position A (heading across and slightly into the wind), the aerodynamic device controller module 185 may deploy the bottom diffuser 14 and the active spoiler 15, where the length of the deployment depends on the orientation of the vehicle 220. At position B (heading into the wind), the aerodynamic device controller module 185 may deploy the vortex generators 16, deploy the left-side and right-side panels 13 (length based on speed), deploy the bottom diffuser 14 and the active spoiler 15, and may close the active grill shutter 11. At position C (heading across the wind), the aerodynamic device controller module 185 may retract the left-side and right-side panels 13 and may open the wheel shutters 12. At any of positions A, B and C, the aerodynamic device controller module 185 activates the optimum combination of active aerodynamic flow control devices 11-17 identified by its self-learning module, according to the current driving situation, such as vehicle orientation and wind condition.

Figure 3:
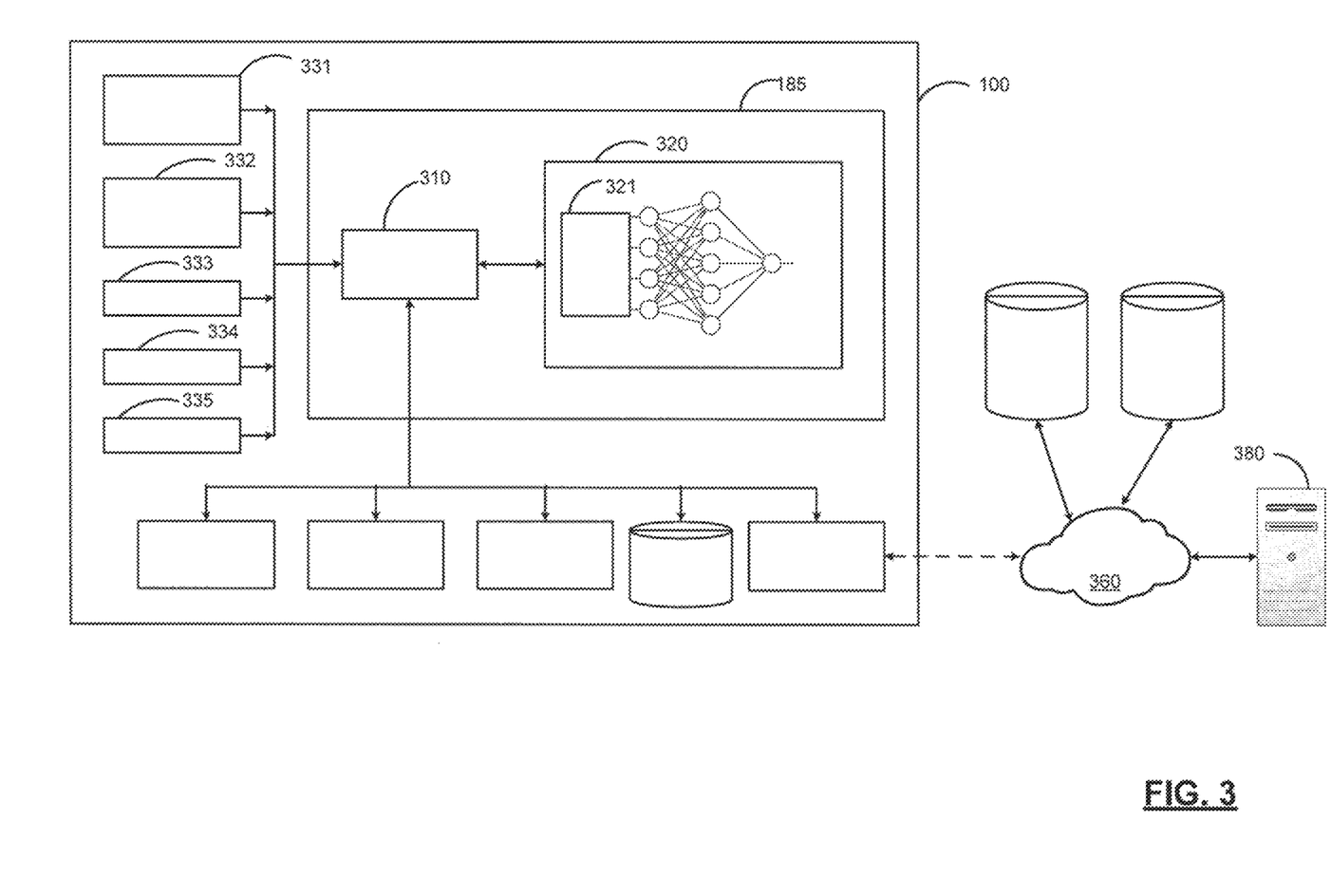
FIG. 3 is a functional block diagram showing the aerodynamic device controller module in greater detail and other remote infrastructure components according to one embodiment of the present disclosure.

FIG. 3 is a functional block diagram showing in greater detail the aerodynamic device controller module 185 and other remote infrastructure components according to one embodiment of the present disclosure. The aerodynamic device controller module 185 comprises a control and coordination module 310 and a self-learning system module 320. The self-learning system module 320 comprises state information 321 and a deep neural network (DNN). The aerodynamic device controller module 185 receives as inputs road GPS data 331, inertial movement unit (IMU) data 332 for vehicle position (e.g., roll, pitch, yaw), weather data 333, vehicle speed data 334, and V2X data, which includes data (e.g., traffic) received from vehicle-to-mobile network infrastructure communications and vehicle-to-vehicle communications. The aerodynamic device controller module 185 also receives data from the vehicle stability sensor module 340 and the fuel economy sensor module 345. Data from the vehicle stability sensor module 340 may include the inertial movement unit (IMU) data 332.

The aerodynamic device controller module 185 stores data in, and retrieves data from, an onboard database (OB DB) 350. Mobile transceiver (XCVR) 194 provides bi-directional communications between the aerodynamic device controller module 185 and an external internet protocol (IP) network 360. By way of example, but not limitation, the mobile transceiver 194 may be a cellular transceiver that communicates with the IP network 360 in order to access the server 380 and to store to or retrieve data from a cloud storage database 370 or an "other vehicle" database 375. The data in the other vehicle database 375 may include, for example the V2X data 335. The data in the cloud storage database 370 may include, for example, the weather data 333 (wind, temperature, precipitation, etc.), the road GPS data 331, or other information (e.g., traffic).

Together, the control and coordination module 310, the self-learning system module 320, and the server 380 comprise a self-learning controller that continuously refines and updates the control algorithm executed by the control and coordination module 310 based on a reward system for improved vehicle performance based on the telemetric and on-vehicle sensors. The self-learning controller determines which of the active aerodynamic flow control devices 11-17 to deploy and by what amount (e.g., distance, open, closed).

The self-learning controller comprises a closed-loop control system that coordinates the adjustable active aerodynamic flow control devices 11-17 on the vehicle 100 to achieve an optimal fuel economy and vehicle stability based on data received from fuel economy sensor 345 and vehicle stability sensor 340. The control and coordination module 310 and the self-learning system module 320 determine a configuration of the active aerodynamic flow control devices 11-17 based on actual driving (e.g., vehicle speed, vehicle, orientation), environment (e.g., wind speed, wind direction), and terrain (e.g., roads, elevation). The state information 321 is continually updated over time until an optimal point is identified. This may be done, for example, by using small perturbations to find a local optimal point. For a given set of environmental, terrain, and driving conditions, the configuration or settings of the active aerodynamic flow control devices 11-17 may be recorded in onboard database 350 and may also be relayed to cloud storage 370 by mobile transceiver 194 and IP network 360. When the same (or very similar) set of environmental, terrain, and driving conditions are encountered again, the control and coordination module 310 may retrieve the configuration of the active aerodynamic flow control devices 11-17 from onboard database 350 and activate the active aerodynamic flow control devices 11-17 accordingly. Thus, the self-learning controller and system may be self-improved over time using the accumulated data of the vehicle 100 in onboard storage database 350 and/or data in the other vehicle database 375 for a group of vehicles in the region.

Figure 4:
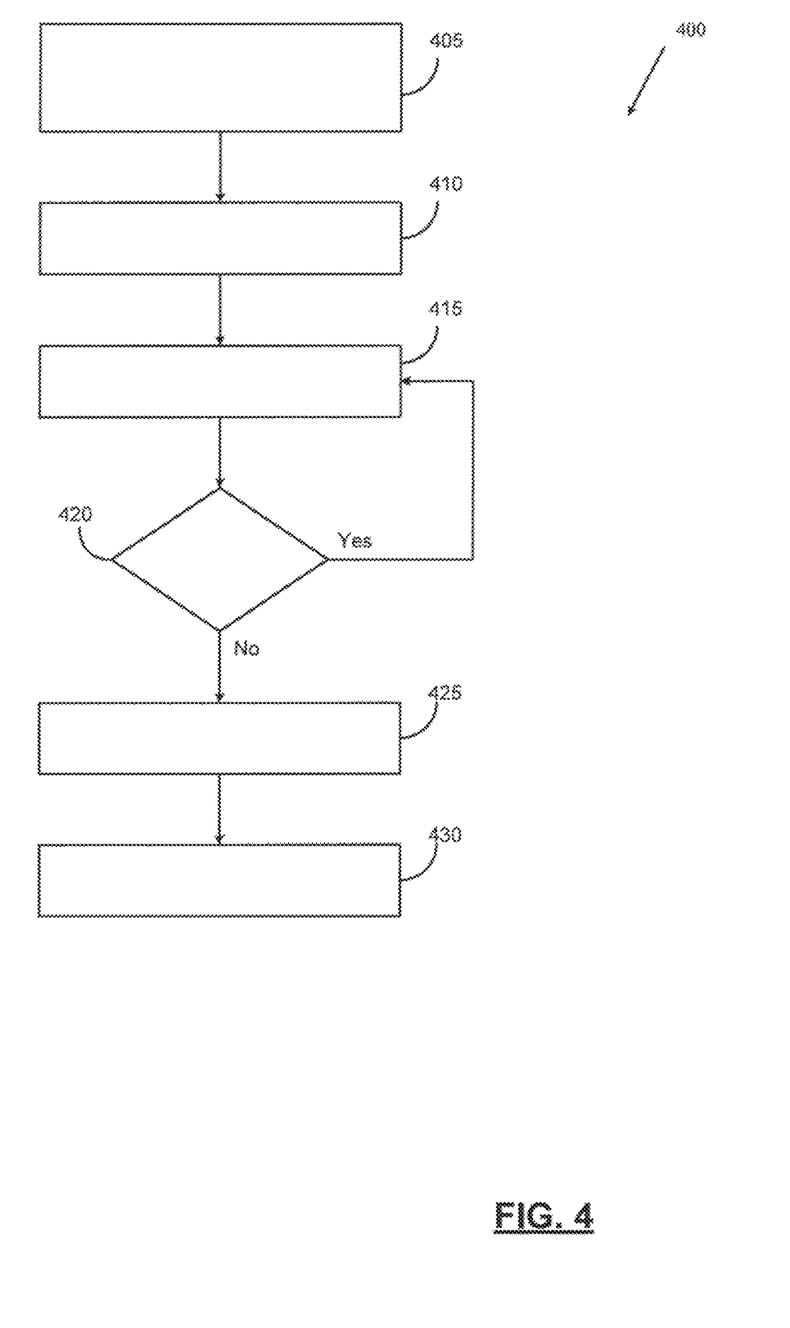
FIG. 4 is a flow diagram illustrating the operation of the aerodynamic device controller module according to one embodiment of the present disclosure.

FIG. 4 is a flow diagram 400 illustrating the operation of the aerodynamic device controller module 185 according to one embodiment of the disclosure. In 405, the control and coordination module 310 in aerodynamic device controller module 185 receives current information for weather, road, terrain, traffic, speed, direction, stability, and the like from vehicle sensors and from the V2X data. In 410, the control and coordination module 310 may adjust one or more of the active aerodynamic flow control devices 11-17 at various settings. The control and coordination module 310 updates the state information 321 with the new settings accordingly.

In 415, the control and coordination module 310 receives feedback information from the fuel economy sensor 345 and the vehicle stability sensor 340 and determines the updated observed fuel economy and vehicle stability. If improved fuel economy and/or vehicle stability is observed, this is interpreted as a reward by the deep neural network (DNN) in the self-learning system module 320 and the control and coordination module 310 updates the state information 321 with the improved fuel economy and/or vehicle stability accordingly.

In 420, the control and coordination module 310 may determine if further improvement is possible by making small adjustments (e.g., perturbations) to the settings of the aerodynamic flow control devices 11-17. The control and coordination module 310 will again receive feedback information from the fuel economy sensor 345 and the vehicle stability sensor 340 and will determine if there is an improvement in the updated observed fuel economy and/or vehicle stability. If Yes in 420, then the control and coordination module 310 will continue making small adjustments (e.g., perturbations) to the aerodynamic flow control devices 11-17 and continue to determine in 415 and 415 if there is an improvement in the updated observed fuel economy and/or vehicle stability.

If no further improvement is observed in the observed fuel economy and/or vehicle stability, then in 425 the control and coordination module 310 will record in the onboard database 350 the AI state information 321 and other vehicle data corresponding to the optimal fuel economy and/or vehicle stability. Optionally, in 430, the control and coordination module 310 also may record the AI state information 321 and other vehicle data in the cloud storage database 370. Thereafter, for a given set of current road conditions and current weather conditions, the control and coordination module 310 retrieves from the onboard database 350 the stored settings for one or more of the active aerodynamic flow control devices 11-17 based on the corresponding (or closest matching) set of stored road conditions and weather conditions in the onboard database 350. This enables the aerodynamic device controller module 185 to adjust quickly the aerodynamic flow control devices 11-17 to the optimal settings for the current road conditions and current weather conditions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system of a vehicle comprising:
   a plurality of adjustable aerodynamic control devices associated with the vehicle;
   a fuel economy sensor configured to determine a first fuel economy measurement; and
   an aerodynamic device controller module configured to adjust a first one of the plurality of adjustable aerodynamic control devices and to receive from the fuel economy sensor a second fuel economy measurement, wherein the aerodynamic device controller module is further configured to store in an onboard database state information corresponding to settings of the plurality of adjustable aerodynamic control devices if the second fuel economy measurement is an improvement over the first fuel economy measurement.

2. The control system of a vehicle in claim 1, further comprising:
   a vehicle stability sensor configured to determine a first vehicle stability measurement,
   wherein the aerodynamic device controller module, in response to the adjustment of the first one of the adjustable aerodynamic control devices, receives from the vehicle stability sensor a second vehicle stability measurement.

3. The control system of a vehicle in claim 2, wherein the aerodynamic device controller module is further configured to store in the onboard database the state information corresponding to settings of the plurality of adjustable aerodynamic control devices if the second vehicle stability measurement is an improvement over the first vehicle stability measurement.

4. The control system of a vehicle in claim 3, further comprising:
a wireless transceiver coupled to the aerodynamic device controller module and configured to communicate with a remote cloud storage database via a cellular network,
wherein the aerodynamic device controller module is further configured to transmit to the remote cloud storage database via the wireless transceiver the state information corresponding to settings of the plurality of adjustable aerodynamic control devices if the second fuel economy measurement is an improvement over the first fuel economy measurement.

5. The control system of a vehicle in claim 4, wherein the aerodynamic device controller module is further configured to transmit to the remote cloud storage database via the wireless transceiver the state information corresponding to settings of the plurality of adjustable aerodynamic control devices if the second vehicle stability measurement is an improvement over the first vehicle stability measurement.

6. The control system of a vehicle in claim 3, wherein the aerodynamic device controller module further comprises:
a control and coordination module; and
a self-learning system module coupled to the control and coordination module and including a deep neural network,
wherein the control and coordination module receives vehicle data and weather data and stores the state information corresponding to settings of the plurality of adjustable aerodynamic control devices in the onboard database.

7. The control system of a vehicle in claim 6, wherein the vehicle data includes a vehicle speed value.

8. The control system of a vehicle in claim 7, wherein the vehicle data includes GPS road data and wherein the GPS road data includes a vehicle direction value.

9. The control system of a vehicle in claim 6, wherein the vehicle data includes yaw data, roll data, and pitch data.

10. The control system of a vehicle in claim 6, wherein the weather data includes a wind speed value and a wind direction value.

11. A method of controlling a plurality of adjustable aerodynamic control devices associated with a vehicle comprising:
in a fuel economy sensor, determining a first fuel economy measurement;
adjusting a first one of the plurality of adjustable aerodynamic control devices;
receiving from the fuel economy sensor a second fuel economy measurement; and
storing in an onboard database of vehicle state information corresponding to settings of the plurality of adjustable aerodynamic control devices if the second fuel economy measurement is an improvement over the first fuel economy measurement.

12. The method in claim 11, further comprising:
in a vehicle stability sensor, determining a first vehicle stability measurement; and
in response to the adjustment of the first one of the adjustable aerodynamic control devices, receiving from the vehicle stability sensor a second vehicle stability measurement.

13. The method in claim 12, further comprising:
storing in the onboard database the vehicle state information corresponding to settings of the plurality of adjustable aerodynamic control devices if the second vehicle stability measurement is an improvement over the first vehicle stability measurement.

14. The method in claim 13, further comprising:
transmitting to a remote cloud storage database via a wireless transceiver the vehicle state information corresponding to settings of the plurality of adjustable aerodynamic control devices if the second fuel economy measurement is an improvement over the first fuel economy measurement.

15. The method in claim 14, further comprising:
transmitting to the remote cloud storage database via the wireless transceiver the vehicle state information corresponding to settings of the plurality of adjustable aerodynamic control devices if the second vehicle stability measurement is an improvement over the first vehicle stability measurement.

16. The method in claim 13, wherein storing the vehicle state information corresponding to settings of the plurality of adjustable aerodynamic control devices is performed by a self-learning system module including a deep neural network, and further including:
receiving vehicle data and weather data; and
storing the vehicle state information corresponding to settings of the plurality of adjustable aerodynamic control devices in the onboard database.

17. The method in claim 16, wherein the vehicle data includes a vehicle speed value.

18. The method in claim 17, wherein the vehicle data includes GPS road data and wherein the GPS road data includes a vehicle direction value.

19. The method in claim 16, wherein the vehicle data includes yaw data, roll data, and pitch data.

20. The method in claim 16, wherein the weather data includes a wind speed value and a wind direction value.

* * * * *